United States Patent [19]

Okano et al.

[11] 4,432,446
[45] Feb. 21, 1984

[54] ELECTROMAGNETIC COUPLING APPARATUS

[75] Inventors: Reijiro Okano; Kiyoshi Usami, both of Oobu, Japan

[73] Assignee: Nippondenso Co., Ltd., Kariya, Japan

[21] Appl. No.: 267,424

[22] Filed: May 26, 1981

[30] Foreign Application Priority Data

Jun. 28, 1980 [JP] Japan .................................. 55-91085
Dec. 11, 1980 [JP] Japan ................................ 55-178267

[51] Int. Cl.³ .............................................. F16D 27/10
[52] U.S. Cl. ..................................... 192/84 C; 335/289
[58] Field of Search ......................... 192/84 R, 84 C; 188/161, 163, 164; 335/288, 289

[56] References Cited

U.S. PATENT DOCUMENTS

| 1,754,587 | 4/1930 | Weydell | 335/288 |
| 3,298,111 | 1/1967 | Parr | 29/513 X |
| 3,455,421 | 7/1969 | Miller | 192/84 C |
| 4,241,818 | 12/1980 | Miller | 192/84 C X |
| 4,285,421 | 8/1981 | Halsted | 192/84 C |

Primary Examiner—Allan D. Herrmann
Attorney, Agent, or Firm—Cushman, Darby & Cushman

[57] ABSTRACT

An electromagnetic coupling apparatus for interrupting power transmission is disclosed in which a terminal of a magnet coil for attracting an armature to a rotary body is connected with an electrical terminal of an electric connector directly outside of a fixing member without using a lead wire or the like therebetween. A stopper is secured in direct contact or with a small gap to a recess formed at part of the fixing member, thus preventing the rotation of the yoke including the magnet coil.

8 Claims, 9 Drawing Figures

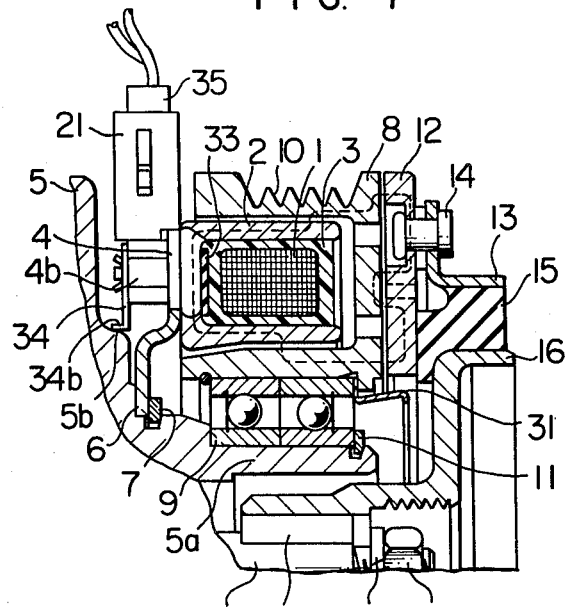
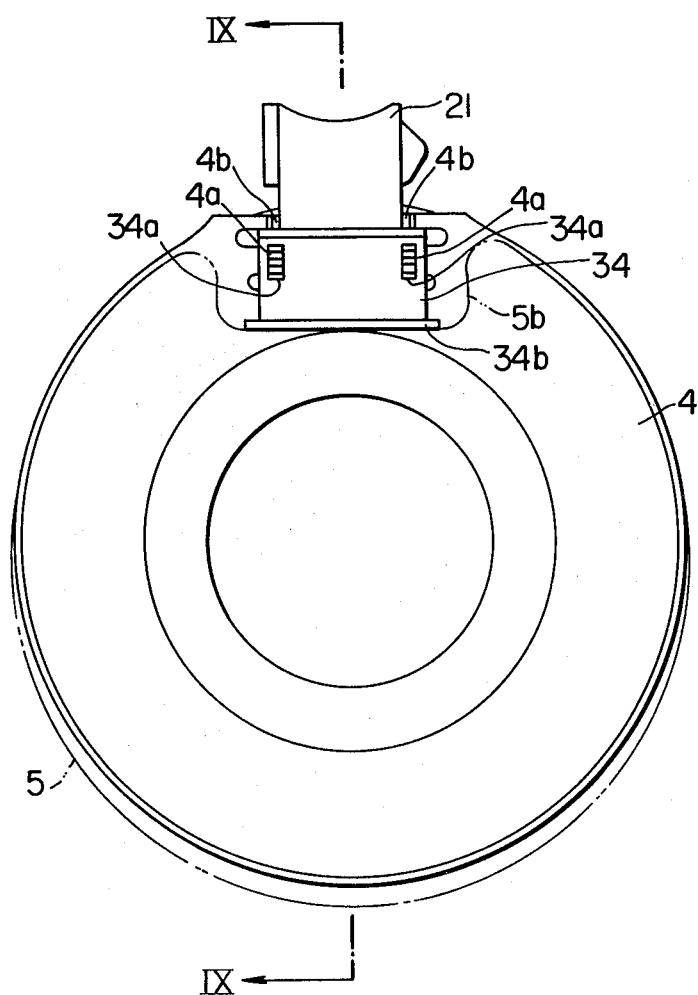
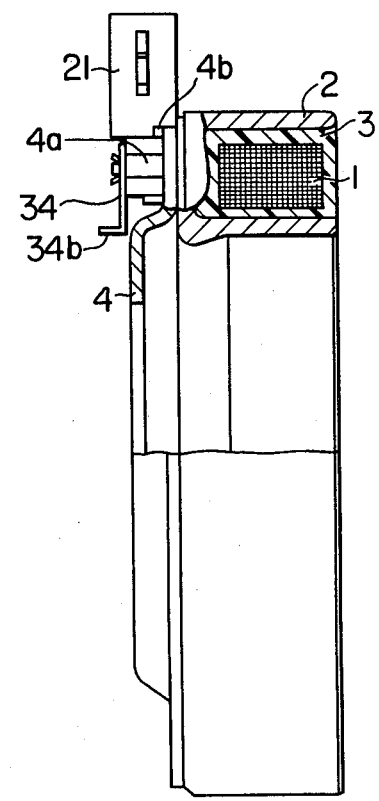

ELECTROMAGNETIC COUPLING APPARATUS

BACKGROUND OF THE INVENTION

The present invention relates to an electromagnetic coupling apparatus for interrupting power transmission or more in particular to an electromagnetic coupling apparatus effectively used with an electromagnetic cluch for transmitting engine power to a refrigerant compressor of an automobile cooling system.

In conventional electromagnetic clutches used with a refrigerant compressor of the automobile cooling system shown in FIG. 1, the terminal 1a of a magnet coil 1 and a lead wire 25 of an electric connector 21 are soldered to each other on the inside of a yoke 2 (at the position shown by A in FIG. 1), and epoxy resin 3 is filled between the yoke 2 and the coil 1. The lead wire 25 which is supported by a rubber bushing 22 is adapted to be led out of the fixing member 4 and the yoke 2.

This type of conventional electromagnetic clutches is difficult to assemble automatically by machine due to the dual disadvantages that the soldering is effected at position A within the yoke 2 and that the soldering is required with the lead wire 25 which is comparatively soft and difficult to support in position securely. Thus the electromagnetic clutches are unavoidably assembled manually, resulting in a low working efficiency.

Further, a small circular hole is formed at part or the yoke 2 supporting the magnet coil 1, and a pin is driven and secured in the front housing of the compressor. This pin is fitted with the small hole so that the yoke 2 is securely fixed on the front housing.

Nevertheless, the pin is likely to come off due to the strong vibrations applied to the compressor. Once this pin comes off the hole, the yoke 2 supporting the magnet coil 1 rotates, with the result that the lead wire of the magnet coil is tensioned and broken. The breakage of the magnet coil lead wire makes the electromagnetic clutch inoperative, thereby causing a serious accident.

SUMMARY OF THE INVENTION

An object of the present invention is to provide an electromagnetic coupling apparatus on which an electric connector may be mounted in a satisfactory manner with comparative ease, thus making it possible to assemble the electromagnetic coupling apparatus automatically with machine.

Another object of the invention is to provide an electromagnetic coupling apparatus in which the yoke is securely fixed and prevented from turning.

In order to achieve the above-mentioned objects, according to the present invention, there is provied an electromagnetic coupling apparatus comprising means for connecting the terminal of a magnet coil to the electric terminal of an electric connector directly outside of a fixing member and a stopper member fixed in direct contact with or adjacent to a recess formed at part of the fixing member.

BRIEF DESCRIPTION OF THE DRAWINGS

FIG. 7 is a sectional view showing another embodiment of the present invention.

FIG. 8 is a front view of a fixing member shown in FIG. 7.

FIG. 9 is a sectional view taken in line IX—IX in FIG. 8.

DESCRIPTION OF THE PREFERRED EMBODIMENTS

An electromagnetic coupling apparatus according to the present invention will be described in detail below with reference to an embodiment.

Figure 1:
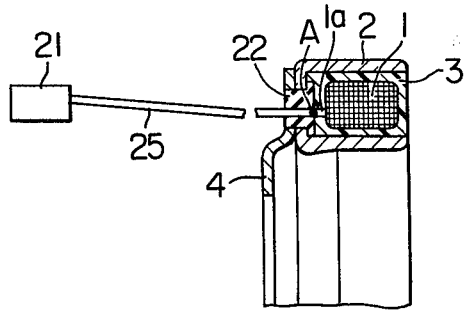
FIG. 1 is a sectional view showing the essential parts of a conventional magnetic clutch.
Figure 2:
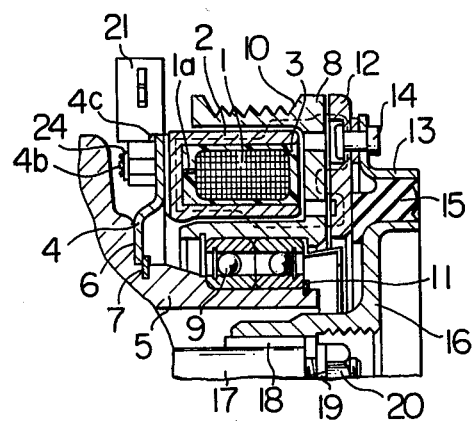
FIG. 2 is a sectional view showing the essential parts of an electromagnetic coupling apparatus according to the present invention.

A sectional view of the electromagnetic coupling apparatus according to the present invention is shown in FIG. 2. In FIG. 2, the same reference numerals as those in FIG. 1 denote the same component elements.

Specifically, in FIG. 2, reference numeral 1 designates a magnet coil, and numeral 2 a yoke formed of a channel-shaped iron member for housing the coil 1. Epoxy resin 3 is filled between the yoke 2 and the magnet coil 1 thereby to fixedly support the magnet coil 1 without contacting the yoke 2. An annular fixing member 4 is welded on the bottom of the yoke 2, which annular fixing member 4 is fitted into a holding groove 6 formed in the housing 5 of the refrigerant compressor thereby to secure the yoke 2. Numeral 7 designates a circlip for preventing the fixing member 4 from coming off from the holding groove 6.

Numeral 8 designates a rotary body arranged to cover the outer surface of the yoke 2 through a small gap therebetween. The inner surface of the rotary body 8 is rotatably supported on the housing 5 through a bearing 9, while the outer surface thereof is formed with a pulley groove 10 adapted to engage a V-belt having a plurality of V-shaped grooves, not shown. Thus, this rotary body 8 is rotated by the driving power applied thereto through a belt from an automotive engine not shown. Numeral 11 designates a circlip for holding the inner race of the bearing 9 on the housing 5.

Numeral 12 shows an annular armature which is opposed, through a small gap, to the side of the rotary body 8. This armature 12 is coupled by a rivet 14 to an iron ring 13 having an L shaped section. Also, the iron ring 13 and the armature 12 are coupled to a hub 16 through a cushion rubber 15. The hub 16 is coupled by way of a key 18 to a rotary shaft 17 of the refrigerant compressor and further through a washer 19 to the rotary shaft 17 by a nut 20. In this way, the rotation of the armature 12 is adapted to be transmitted through the iron ring 13, the cushion rubber 15 and the hub 16 to the rotary shaft 17.

In other words, when the magnet coil 1 is excited by the current flowing in the magnet coil 1, the magnetic flux as shown by the dashed line in the drawing is generated and the elasticity of the cushion rubber 15 causes the armature 12 to be attracted to the rotary body 8, so that the rotation of the rotary body 8 is transmitted to the rotary shaft 17 from the armature 12. When the magnet coil 1 is de-energized, on the other hand, the elasticity of the cushion rubber 15 pulls back the armature 12 with the result that the turning effort of the rotary shaft 8 stops being transmitted to the armature 12.

Power is supplied to the magnet coil 1 from a vehicle-carried power supply through an electric connector 21 arranged between the fixing member 4 and the housing 5 on the outer surface of the fixing member 4.

Figure 3:
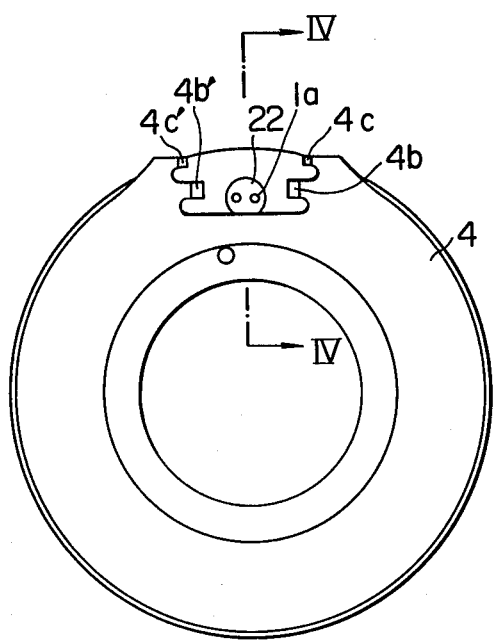
FIG. 3 is a side view showing the electromagnetic coupling apparatus of FIG. 2 with the electric connector taken off.
Figure 4:
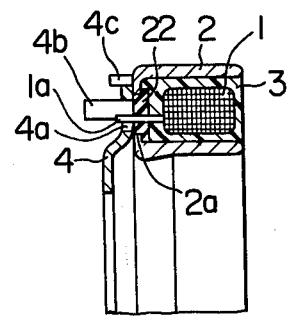
FIG. 4 is a sectional view taken in line IV—IV in FIG. 3.
Figure 5:
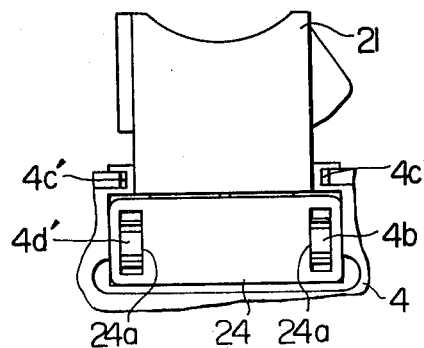
FIG. 5 is a front view showing the electric connector mounted on the electromagnetic coupler according to the present invention shown in FIG. 2.
Figure 6:
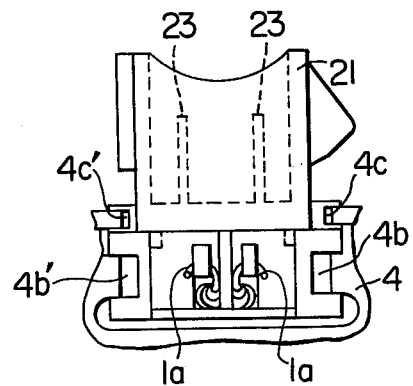
FIG. 6 is a front sectional view of the apparatus of FIG. 5.

FIG. 3 is a side view of an electromagnetic coupling apparatus according to the present invention of FIG. 2 with the electric connector demounted, FIG. 4 is a sectional view taken in line IV—IV in FIG. 3, FIG. 5 is a front view showing the electromagnetic coupling apparatus with the electric connector mounted thereon, and FIG. 6 is a front sectional view of the apparatus shown in FIG. 5.

In FIGS. 3 to 6, the bottom of the yoke 2 and the fixing member 4 are respectively formed with through holes 2a and 4a, through which the coil terminal 1a held on the rubber bushing 22 is projected outside of the fixing member 4. As shown in FIG. 6, the coil terminal 1a is soldered or fusion-bonded to the electric terminal 23 of the electric connector 21 outside of the fixing member 4. The electric connector 21 and the fixing member 4 are secured to each other in such a manner that the electric connector 21 is inserted as shown in FIG. 6 between the fixing lugs 4b, 4c, 4b' and 4c' cut up in advance outside of the fixing member 4 as shown in FIGS. 3 and 4. These fixing lugs 4b, 4c, 4b' and 4c' are bent inward thereby to secure the electric connector 21. After fixing the electric connector 21, as shown in FIG. 5, a cover 24 is arranged on the outside of the electric connector 21 in a manner to cover the coil terminal 1a and the electrical terminal 23, followed by the fixing lugs 4b and 4b' being pressed open thereby to hold the cover 24 on the fixing lugs 4b and 4b' with the fixing lugs 4b and 4b' inserted into the holding aperture 24a of the cover 24.

Thus, according to the present invention, the magnet coil terminal 1a and the electric terminal 23 of the electric connector 21 are coupled with each other outside of the fixing member 4 and both the terminals 1a and 23 have a certain degree of strength. Specifically, the electric terminal 23 of the electric connector 21 is securely held by the fixing lugs 4b, 4c, 4b' and 4c', so that the coil terminal 1a and the electric terminal 23 are capable of being soldered or fusion-bonded to each other very easily and securely.

In addition, the electric connector 21 can be secured outside of the fixing member 4 only by bending and press-opening the fixing lugs 4b, 4c, 4b' and 4c', thus greatly facilitating the securing work. For this reason, according to the present invention, the electric connector 21 may be secured automatically by machine.

In the above-mentioned embodiment, the fixing lugs 4b, 4c, 4b' and 4c' cut up from the fixing member 4 are used for securing the electric connector 21. As an alternative to the fixing lugs 4b, 4c, 4b' and 4c', other fixing means such as rivets may be used as required.

Another embodiment of the present invention in which the electromagnetic coupling apparatus according to the present invention is applied to an electromagnetic clutch for the car cooler compressor is shown in FIG. 7. In FIG. 7, those reference numerals identical to those in FIGS. 2 to 6 denote the same component element as those having the same numerals in FIGS. 2 to 6.

In FIG. 7, numeral 31 designates an annular cover fixed on the rotary body 8 together with the bearing 9 for preventing the grease or the like of the bearing 9 from attaching to the friction surfaces of the rotary body 8 and the armature 12. Numeral 21 designates an electric connector of resin which is fixedly caulked to the fixing member 4 by means of a plurality of fixing lugs 4a integrally cut up from the iron fixing member 4. The electric connector 21 of resin contains two electric connection terminals (not shown) made of a conductive material, to which the ends of the two lead wires of the magnet coil 1 are electrically connected by soldering or the like. These lead wires are adapted to be wired into the electric connector 21 through a hole formed in the yoke 2 and the fixing member 4. Numeral 33 shows a rubber bushing for holding the lead wires securely fitted in the hole of the yoke 2.

Numeral 34 shows a stopper of a metal plate disposed on the electric connector 21 and having a hole 34a in which the fixing lug 4a is to be inserted. By caulking this fixing lug 4a, the electric connector 21 is secured while at the same time securing the stopper 34 to the fixing member 4.

An end of the stopper 34 is bent into an L shape in such a manner that the L-shaped bent portion 34b is in direct contact with the bottom of the recess 5b formed at part of the front housing 5.

The front view of the fixing member shown in FIG. 7 is illustrated in FIG. 8, and the sectional view taken in line IX—IX in FIG. 8 is illustrated in FIG. 9.

The L-shaped bent portion 34b, as shown in FIG. 8, has substantially the same width as the botton of the recess 5b.

Numeral 35 shows a mating connector securely fitted to the electric connector 21 to be electrically connected therewith. This connector 35 is connected to an automotive power battery through an electromagnetic clutch control circuit not shown.

In this configuration, assume that the switch of the control circuit not shown is closed and power is supplied to the magnetic coil 1, thus exciting the magnet coil 1. As shown by the magnetic lines of force in FIG. 7, magnetic fluxes are generated so that the armature 12 is attracted to the rotary body 8 against the elasticity of the cushion rubber 15, thus applying the turning effort of the rotary body 8 to the rotary shaft 17 from the armature 12. When power supply to the magnet coil 1 is stopped, on the other hand, the armature 12 is pulled back by the elasticity of the cushion rubber 15, with the result that the turning effort of the rotary body 8 stops being transmitted to the armature 12.

In view of the fact that the bent portion 34b of the stopper 34 fixedly caulked to the fixing member 4 is in contact with the bottom of the recess 5b of the front housing 5, the interposition of the stopper 34 assuredly prevents relative rotations of the front housing 5 and the fixing member 4. Therefore, even when a violent vibration is applied to the compressor, the yoke 2 containing the magnet coil 1 is not turned, thus preventing the lead wires of the magnet coil 1 from being broken.

In the aforementioned embodiment, the stopper 34 is fixedly caulked integrally to the electric connector 21. Instead of this method, the stopper 34 may be secured to the fixing member 4 by such means as welding or caulking independently of the electric connector 21.

Further, the fixing member 4 and the yoke 2 may be integrally configured instead of being made of different parts.

Also, the stopper 34 may of course be arranged with some gap with the recess 5b instead of in direct contact therewith with equal effect.

Furthermore, the present invention is applicable widely to such devices as the electromagnetic brake other than the electromagnetic clutch.

It will be understood from the foregoing description that the electromagnetic coupling apparatus according to the present invention is such that the electric terminal of the electric connector and the terminal of the magnet coil are connected to each outside of the fixing member, and the magnet coil terminal is connected directly to the electric terminal of the electric connector without a lead wire or the like interposed therebetween, resulting in the great advantage that the electric connector can be very easily mounted. Accordingly, the electric connector of the apparatus according to the present invention may be automatically mounted by machine.

A still further great advantage of the present invention is that the rotation of the magnet coil due to vibrations or the like is prevented by a simple construction, thus preventing the inoperativeness of the apparatus which otherwise might be caused by the breakage of the lead wire of the magnet coil.

We claim:

1. An electromagnetic coupling apparatus comprising a rotary body rotated by the driving power from a drive source, an armature disposed in opposed and spaced relation with said rotary body, a magnet coil having terminals projecting therefrom and having a magnetic circuit containing said rotary body and said armature for attracting and holding said armature to said rotary body, a yoke containing said magnet coil, a hub coupled to said armature through an elastic member for transmitting the rotation of said armature, an electric connector in direct contact with said yoke and connected with said magnet coil, and a fixing member for securing said yoke and said electric connector together, said yoke and said fixing member having a through hole through which the terminals of said magnet coil project to the outside of said fixing member, said electric connector having an end connected to an end of said magnet coil in said electric connector.

2. An electrical coupling apparatus comprising a rotary body rotated by the driving power from a drive source, an armature disposed in opposed and spaced relation with said rotary body, a magnet coil having a magnetic circuit containing said rotary body and said armature for attracting and holding said armature to said rotary body, a yoke containing said magnetic coil, a hub coupled to said armature through an elastic member for transmitting the rotation of said armature, an electric connector secured to said yoke and connected with said magnet coil, a housing, and a fixing member securing said yoke to the housing, part of said fixing member being formed with a fixing means corresponding to said electric connector.

3. An electromagnetic coupling apparatus according to claim 2, wherein said apparatus further comprises a stopper secured to said fixing members in direct contact with said housing.

4. An electromagnetic coupling apparatus according to claim 2, wherein said apparatus further comprises a stopper secured to said fixing member in opposed relation with a small gap with said housing.

5. An electromagnetic coupling apparatus according to claim 2, 3, or 4, wherein said electric connector is fixedly pressed in between a plurality of fixing lugs formed on said fixing member.

6. An electromagnetic coupling apparatus as in claim 2 wherein said fixing means includes fixing lugs formed on said fixing member.

7. An electromagnetic coupling apparatus as in claim 3 wherein said housing has a recess in a portion thereof and wherein said stopper is in direct contact with the bottom of said recess.

8. An electromagnetic coupling apparatus comprising a rotary body rotatable by a drive source, an armature disposed in opposed and spaced relation with said rotary body, a magnet coil having terminals projecting therefrom and having a magnetic circuit containing said rotary body and said armature for attracting and holding said armature to said rotary body, a yoke containing said magnet coil, a hub coupled to said armature through an elastic member for transmitting the rotation of said armature, a stationary fixing member fixed to said yoke, said fixing member and said yoke having a hole through which the terminals of said magnet coil project, an electrical connector fixed to said fixing means at the location of the hole therein, said electrical connector having terminals connected to said coil terminals at a location outside said fixing member.

* * * * *